B. R. BENJAMIN.
TEMPERING TANK.
APPLICATION FILED JUNE 30, 1910.
993,497.
Patented May 30, 1911.
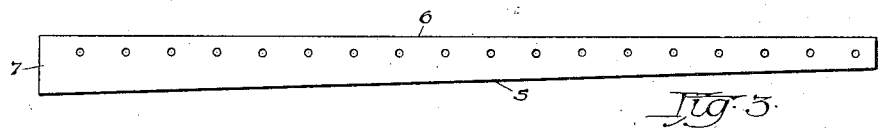
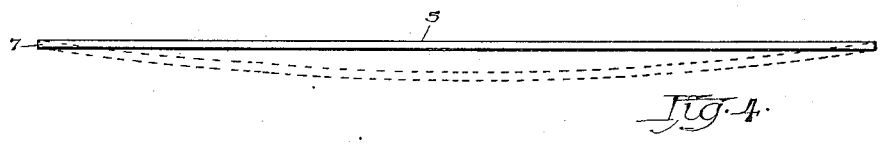
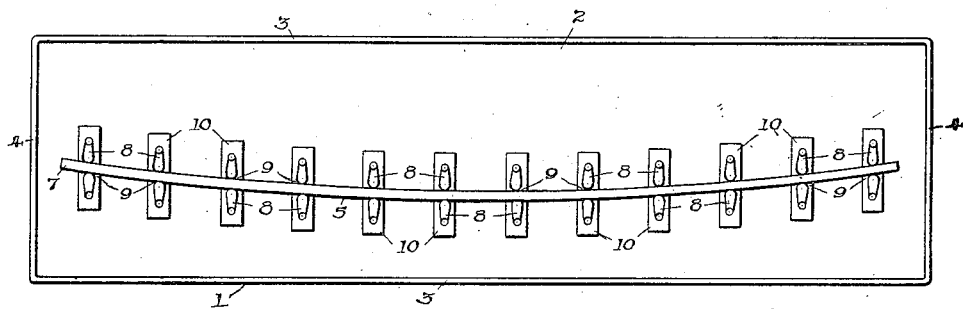
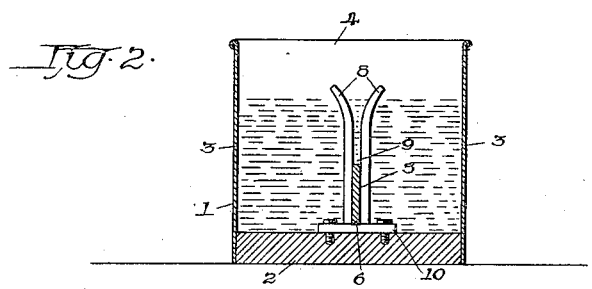
Witnesses:
Inventor
Bert R. Benjamin.
By
Attorney.

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

TEMPERING-TANK.

993,497.     Specification of Letters Patent.     Patented May 30, 1911.

Application filed June 30, 1910. Serial No. 569,624.

*To all whom it may concern:*

Be it known that I, BERT R. BENJAMIN, a citizen of the United States, residing at Oak Park, in the county of Cook and State of Illinois, have invented certain new and useful Improvements in Tempering-Tanks, of which the following is a specification.

My invention relates to tanks designed to contain a quantity of tempering or cooling fluid, or other medium adapted to cool and temper metal parts, and it consists in providing a tank of a preferred form to receive and retain the article to be cooled in a predetermined shape; the object of my invention being to provide a construction of tank adapted to receive mower finger bar blanks and retain them in a predetermined curved form while being subjected to a cooling and tempering process. I have found that heating the blanks to a degree of temperature whereby they may be readily bent in the desired curved shape to be received by the permanent form and cooled while so retained therein, and then straightening them under pressure, provides a bar having a maximum of rigidity to resist a bending strain under the stress of actual field work. I attain these objects by means of the mechanism illustrated by the accompanying drawing, in which—

Figure 1 represents a top plan view of a cooling tank embodying my invention; Fig. 2 represents a cross section of Fig. 1; Fig. 3 represents a top view of a mower finger bar blank; and Fig. 4 is a side elevation of Fig. 3, the dotted line representing the curved shape of the bar before it is placed in the tank.

The same reference numerals designate like parts throughout the several views.

1 represents a cooling tank, preferably rectangular, having a bottom 2, side walls 3 and end walls 4 adapted to receive a quantity of cooling and tempering fluid in which the heated articles may be immersed; 5 represents a mower finger bar.

In treating the blanks from which the finger bars are made I have found it desirable that they have a predetermined degree of curvature in their heated state and that said curvature be maintained during the cooling operation, the curvature being downward at the middle portion of the blank, as represented by dotted lines in Fig. 4.

6 represents the front edge of the bar relative to its line of draft, and 7 its stubbleward end designed to be attached to the inner shoe of a cutting apparatus for mowers.

For the purpose of maintaining the proper curvature of the blanks while cooling, I provide a permanent form, including a series of vertically arranged forked members 8, having intervening spaces 9, having a width substantially equal to the thickness of the blanks to be received therein, and a base 10 integral with the forks, the latter being curved laterally at their upper ends, in a diverging manner above the upper level of the space that receives the blanks, and the base members secured to the bottom of the tank and spaced apart in the direction of its length, and the series of forks placed in a line having a degree of curvature corresponding with that of the heated blank to be placed therein.

What I claim as my invention, and desire to secure by Letters Patent, is:

A cooling tank adapted to contain a cooling medium in which heated articles may be immersed, having, in combination, bottom and side walls, a series of forked members, the members of the forks being curved laterally at their upper ends in a diverging manner having intervening spaces, said spaces below said diverging portions having a width substantially equal to the thickness of the articles to be immersed, said forked members being secured to the bottom of the tank and spaced apart in a line having a curve corresponding to the curvature of the articles to be treated and adapted to receive such articles and retain them in their original and predetermined shape while subjected to the cooling process.

BERT R. BENJAMIN.

Witnesses:
   RAY D. LEE,
   LUD. HOLLAND-LETZ.

---

Copies of this patent may be obtained for five cents each, by addressing the "Commissioner of Patents, Washington, D. C."